US009088942B2

(12) United States Patent
Das et al.

(10) Patent No.: US 9,088,942 B2
(45) Date of Patent: Jul. 21, 2015

(54) FREQUENCY OFFSET ESTIMATION FOR EARLY DETECTION/DECODING (71) Applicant: Telefonaktiebolaget L M Ericsson (publ), Stockholm (SE)

(72) Inventors: Sajal Kumar Das, Bangalore (IN); Pankaj Jaiswal, Bangalore (IN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 198 days.

(21) Appl. No.: 13/762,966

(22) Filed: Feb. 8, 2013

(65) Prior Publication Data

US 2014/0226647 A1  Aug. 14, 2014

(51) Int. Cl.
H04J 3/06 (2006.01)
H04W 56/00 (2009.01)
H04L 27/00 (2006.01)
H04W 52/02 (2009.01)
H04L 7/06 (2006.01)

(52) U.S. Cl.
CPC ....... H04W 56/0035 (2013.01); H04L 27/0014 (2013.01); H04W 52/0229 (2013.01); H04W 56/001 (2013.01); H04L 7/06 (2013.01)

(58) Field of Classification Search
None
See application file for complete search history.

(56) References Cited

U.S. PATENT DOCUMENTS

| 7,107,080 | B2 | 9/2006 | Patel et al. | |
|---|---|---|---|---|
| 7,463,599 | B2 | 12/2008 | Lindoff et al. | |
| 7,852,813 | B2* | 12/2010 | Suh et al. | 370/335 |
| 8,219,118 | B2 | 7/2012 | Kim et al. | |
| 2001/0023184 | A1 | 9/2001 | Kalveram et al. | |
| 2005/0113087 | A1 | 5/2005 | Rick et al. | |
| 2007/0054681 | A1* | 3/2007 | Suh et al. | 455/502 |
| 2007/0140386 | A1 | 6/2007 | Howard | |
| 2008/0240310 | A1* | 10/2008 | Zheng et al. | 375/344 |
| 2009/0245230 | A1* | 10/2009 | Sampath et al. | 370/350 |
| 2010/0034319 | A1 | 2/2010 | Ludvigsen et al. | |
| 2010/0266076 | A1* | 10/2010 | He | 375/344 |
| 2012/0122495 | A1 | 5/2012 | Weng et al. | |

FOREIGN PATENT DOCUMENTS

| EP | 1429506 A2 | 6/2004 |
|---|---|---|
| WO | 0176295 A2 | 10/2001 |

OTHER PUBLICATIONS

3rd Generation Partnership Project. "3rd Generation Partnership Project; Technical Specification Group GSM/Edge Radio Access Network; Digital cellular telecommunications system (Phase 2+); Mobile Station (MS) conformance specification; Part 1: Conformance specification (Release 10)". 3GPP TS 51.010-1, V10.3.0, section 13, pp. 3-129, Dec. 2012, Sophia Antipolis Valbonne, France.

* cited by examiner

Primary Examiner — Bob Phunkulh (74) Attorney, Agent, or Firm — Coats & Bennett, PLLC (57) ABSTRACT Methods and apparatus are provided for improving the performance of frequency offset estimation in scenarios where reception of a data block is terminated early. When the reception of a data block is terminated early, the wireless communication receiver may regenerate the entire data block using information that is known to the wireless communication device. The regenerated data block may then be used for frequency offset estimation to increase the number of symbols available for frequency offset estimation.

12 Claims, 7 Drawing Sheets

FREQUENCY OFFSET ESTIMATION FOR EARLY DETECTION/DECODING

TECHNICAL FIELD

The present invention relates generally to synchronization in mobile communication networks and, more particularly, to frequency offset estimation in wireless communication receivers employing early detection or early decoding to conserve battery power.

BACKGROUND

To establish and maintain a robust link between a wireless communication receiver and a wireless communication transmitter in a wireless communication network, the reference frequency from the local oscillator at the receiver must attain high levels of precision and accuracy. Frequency drift in both idle and active modes can result in dropped calls and missed pages. In the past, Voltage Controlled, Temperature Compensated Crystal Oscillators (VCTCXOs) have been employed in wireless communication receivers to provide a high precision frequency reference to the receiver. Recently, manufacturers have begun to replace relatively expensive VCTCXOs with less expensive Digitally Controlled Crystal Oscillators (DCXOs) at the cost of less precision. Therefore, to prevent frequency drift, most wireless communication receivers use some type of automatic frequency correction circuit to correct frequency errors in the local oscillator.

During start-up, and initial cell selection, the Automatic Frequency Correction (AFC) circuit is used to tune the local oscillator to the cell frequency. Once the local oscillator is synchronized to the correct frequency, the wireless communication device tracks the frequency error by periodically estimating the frequency offset. To enable frequency offset estimation, the base station sends known training symbols to the wireless communication device. By correlating received training symbols with the expected training symbols, an estimate of the frequency offset can be obtained. The frequency offset is input to the AFC circuit to correct for any frequency errors.

In GSM networks, the radio frequency is divided into a series of frames. Each frame comprises eight time slots. A Global Systems for Mobile communication (GSM) data block comprises 456 bits and require four time slots to transmit. The data transmitted in a single time slot is referred to as a data burst. The normal GSM data burst includes 26 training symbols occupying the approximate center of each data burst. Thus, a data block typically includes 104 training symbols that are used for frequency offset estimation.

In most scenarios, the 104 training symbols in a data block are sufficient to enable frequency offset estimation. However, there are some circumstances where reception of a data block may be terminated early in order to conserve battery power. For example, reception of an empty paging block (EPB) transmitted on the Paging Channel (PCH) may be terminated after reception of the first data burst. Also, the wireless communication device may terminate reception of a coded data block after reception of two or three data bursts upon successfully decoding of the data block. In these and similar scenarios where reception of a data block is terminated early, the number of training bits available for frequency offset estimation is reduced and the accuracy of the frequency offset estimation is degraded. The degradation can be severe in idle mode, especially when the wireless communication device is in Discontinuous Reception (DRX) mode. In DRX mode, the wireless communication device is in sleep mode for a large percentage of the time and receives data blocks very infrequently.

SUMMARY

The present invention relates to methods and apparatus for improving the performance of frequency offset estimation in scenarios where reception of a data block is terminated early. The present invention may be employed, for example, along with early detection of an empty paging block and early decoding to conserve battery power. When the reception of a data block is terminated early, the wireless communication device may regenerate the entire data block using information that is known to the wireless communication device. For example, when reception of an empty paging data block is terminated early, the wireless communication device may regenerate the entire paging block using the known data bits. The regenerated empty paging block can then be used for frequency offset estimation. In the case of early decoding, the decoded data bits generated by the decoder may be re-encoded to generate the received data block. The regenerated data block may then be used for frequency offset estimation.

Exemplary embodiments of the invention comprise methods implemented in a wireless communication receiver of frequency offset estimation. In one exemplary method, the wireless communication device receives a portion of a data block transmitted from a wireless communication transmitter. The wireless communication device terminates reception of the data block early, i.e. before the entire data block is received. Using information known to the wireless communication device, the wireless communication device regenerates the entire data block and performs frequency offset estimation using the regenerated data block.

Other embodiments of the invention comprise a wireless communication receiver. An exemplary embodiment of the wireless communication receiver comprises a receiver circuit to receive signals transmitted over a wireless communication channel, and a processing circuit to process the received signals. The processing circuit is configured to receive a portion of a data block transmitted from a wireless communication transmitter and to terminate reception of the data block early, i.e. before the entire data block is received. The processing circuit is further configured to regenerate the entire data block using information known to the wireless communication receiver and to perform frequency offset estimation using the regenerated data block. The processing circuit may also perform other types of data-aided estimation using the regenerated data block, such as timing error estimation, channel impulse response estimation, etc.

Embodiments of the present invention improve frequency offset estimation in scenarios where reception of a data block is terminated early. The improvement in frequency offset estimation will improve frequency synchronization between the wireless communication receiver, e.g. mobile terminal and a wireless communication transmitter, e.g. base station. From the perspective of a user, there will be fewer dropped calls and missed pages because the frequency synchronization is improved.

DETAILED DESCRIPTION

Figure 1:
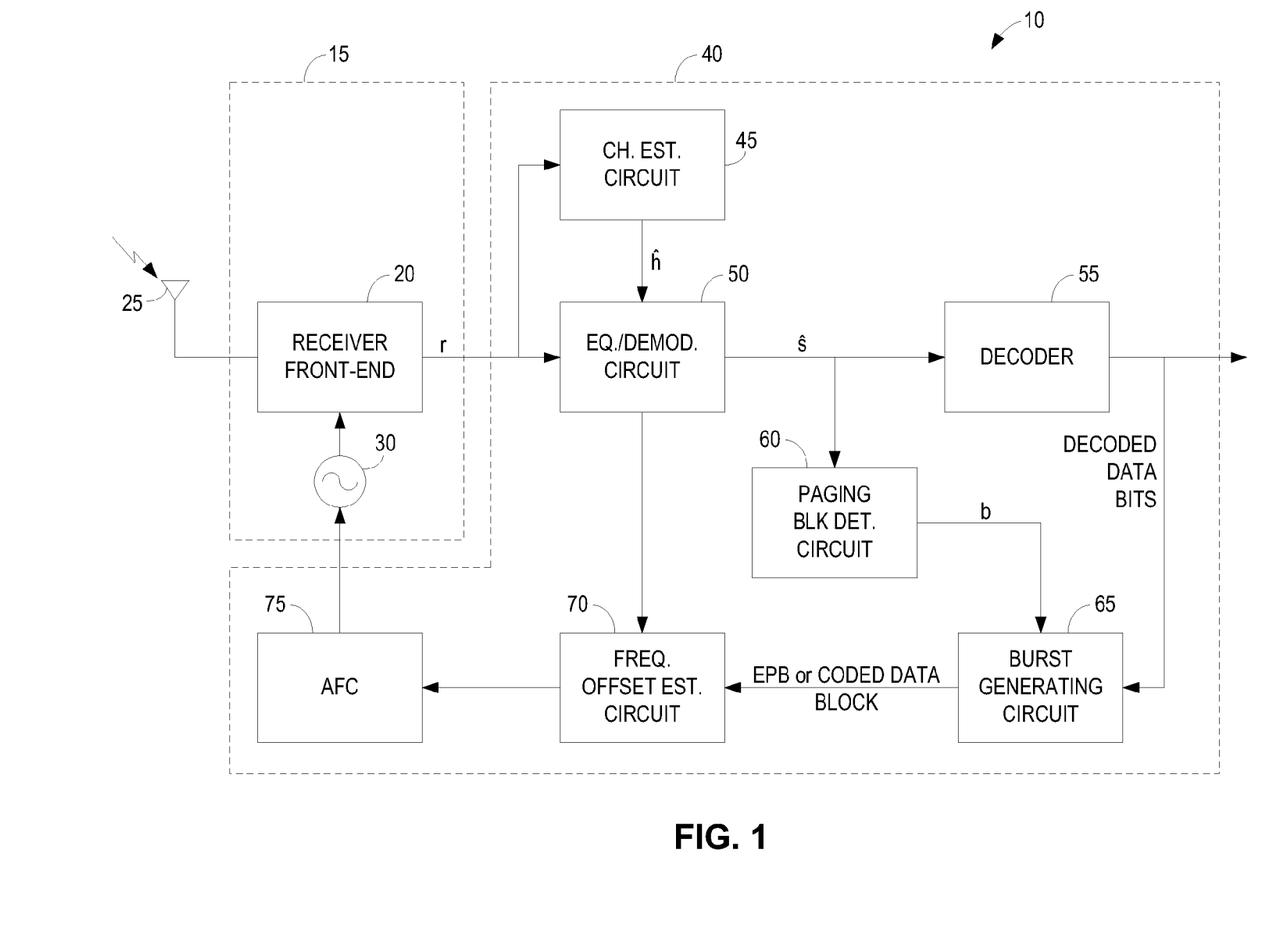
FIG. 1 illustrates a wireless communication device according to an embodiment of the invention.

Referring now to the drawings, FIG. 1 illustrates an exemplary wireless communication receiver 10 according to one embodiment. The wireless communication receiver 10 is configured to receive signals from a wireless communication transmitter. For example, the receiving wireless communication receiver 10 may comprise a mobile terminal that receives signals over a downlink channel from a base station or relay. In other embodiments, the wireless communication receiver 10 may comprises a base station or relay that receives signals over an uplink channel from a mobile terminal.

For illustrative purposes, the exemplary wireless communication receiver 10 is configured to operate in a Global Systems for Mobile communication (GSM) network providing packet data services. For example, the GSM network may provide the General Packet Radio Service (GPRS) or Enhanced GPRS (EGPRS), also known as Enhanced Data Rates for GSM Evolution (EDGE). Those skilled in the art will appreciate that the techniques described herein are not limited to application in these particular wireless communication networks, and may be applied to other wireless communication networks including Wideband Code Division Multiple Access (WCDMA) networks, and Long Term Evolution (LTE) networks.

The wireless communication receiver 10 comprises a receiver circuit 15 and a processing circuit 40. Receiver circuit 15 comprises the radio frequency circuitry for receiving signals over a wireless communication channel. The receiver circuit 15 comprises a receiver front end 20 coupled to one or more receive antennas 25. The receiver front end filters, amplifies and down converts received signals to a baseband frequency. The baseband signals are then converted by an analog to digital converter to digital baseband signals for input to the processing circuit 40. The receiver circuit 15 further comprises a local oscillator 30 providing a frequency reference for the receiver front end 20. The local oscillator 30 may, for example, comprise a Digitally Controlled Crystal Oscillator (DCXO). The processing circuit 40 processes signals received by the receiver circuit 15. Those skilled in the art will appreciate that the wireless communication device 10 may also include a transmitter circuit and associated processing circuits to process signals for transmission.

The processing circuit 40 may comprise one or more microprocessors, digital signal processors, hardware circuits, or a combination thereof. FIG. 1 illustrates the main functional elements of the processing circuit 40 that are involved in the frequency offset estimation. Those skilled in the art will appreciate that the processing circuit 40 may include additional elements not shown in FIG. 1 and that FIG. 1 represents a simplified diagram for the processing circuit 40 for purposes of explanation.

The processing circuit 40 comprises a channel estimation circuit 45, equalization and demodulation circuit 50, decoder 55, burst generating circuit 65, frequency offset estimation circuit 70 and Automatic Frequency Correction (AFC) circuit 75. In some embodiments, the processing circuit 40 may further include a paging block detection circuit 60. The received signal r is input to the channel estimation circuit 45 and equalization and demodulation circuit 50. The channel estimation circuit 45 generates an estimate $\hat{h}$ of the communication channel between the wireless communication receiver 10 and a wireless communication transmitter. The channel estimate $\hat{h}$, is input to the equalization and demodulation circuit 50. The equalization and demodulation circuit 50 uses the channel estimate $\hat{h}$ to perform equalization and demodulation. The equalization and demodulation circuit 50 outputs a sequence of soft modulation symbols $\hat{s}$, hereinafter referred to as soft symbols.

The soft symbols $\hat{s}$ are input to the decoder 55. The decoder 55 generates decoded data bits. If the decoding is successful, the decoded data bits should be a replica of the data bits that were transmitted by the transmitting station.

In some embodiments of the invention, the soft symbols $\hat{s}$ output by the equalization and demodulation circuit 50 may also be input to a paging block detection circuit 60. When the wireless communication receiver 10 is receiving on the paging channel, the soft symbols $\hat{s}$ are input to the paging block detection circuit 60. The paging block detection circuit 60 can detect an empty paging block (EPB) after receiving a single burst of the empty paging block. After detecting an empty paging block, the wireless communication receiver 10 can terminate reception of the empty paging block by turning off the receiver circuit 15 in order to save battery power.

The frequency offset estimation circuit 70 performs frequency offset estimation using training symbols or other known symbols, in the data block. A data block normally comprises four bursts. Each data block includes a predetermined number of training symbols. The training symbols in the training block are output to the frequency offset estimation circuit 70 and used to perform frequency offset estimation. The frequency offset estimation circuit 70 outputs a frequency offset estimate to AFC circuit 75. The purpose of the AFC circuit 75 is to control the local oscillator 30 to correct for any frequency errors that may occur. Based on the frequency offset estimate provided by the frequency offset estimation circuit 70, the AFC circuit 75 generates a control signal to control the local oscillator 30.

The processing circuit 40 further includes a burst generating circuit 65. As noted in the background, there may be circumstances when the wireless communication receiver 10 terminates reception of a data block early, i.e. before the entire data block is received. When reception of a data block is terminated early, the performance of the frequency offset estimation circuit 70 may be impacted because there are fewer training symbol to use for frequency offset estimation.

Assuming perfect symbol timing, the received training bits can be modeled as:

$$z_k = r_k \cdot a^*_k = e^{j(2\pi \Delta f T k + \upsilon)} + n_k \qquad \text{Eq. (1)}$$

where T is the symbol duration, $r_k$ is the received symbol, $a_k$ is the transmitted symbol, $\upsilon$ represents the phase offset, $\Delta f$ represents the frequency offset, and $n_k$ is a zero mean random Gaussian noise with variance $\sigma^2$. Unit energy symbols are assumed, i.e., $E_s = E\{|a_k|^2\} = 1$. The variance $\sigma^2$ is given by:

$$\sigma^2 = \frac{1}{N} \sum_{i=1}^{N} |z_k - \hat{z}_k|^2 \qquad \text{Eq. (2)}$$

The variance is also given by $N_0/(2E_s)$, where $N_0$ denoted the one-sided power spectral density of the noise.

Apart from the noise component, a phase offset υ, and a frequency offset Δf will be introduced by the channel and the local oscillators. Phase and frequency offset are assumed to be constant for the duration of a data burst. The frequency offset estimation circuit 70 needs to find an estimate of the unknown normalized frequency offset Δf·T.

$$\hat{\varepsilon}_{\Delta f} T = \frac{3}{\pi(N-1)} \cdot (\hat{\beta} - \hat{\alpha}) \qquad \text{Eq. (3)}$$

The estimated error variance $\hat{\epsilon}_{\Delta f} T$ of the frequency offset estimator 70 is given by:

$$\alpha = \arg\left\{\sum_{k=1}^{N} \left(e^{j2\pi\varepsilon_{\Delta f} Tk} + n_k\right)\right\} \qquad \text{Eq. (4)}$$

where $$\hat{\alpha} = \arg\left\{\sum_{k=1}^{N} \left(e^{j2\pi\varepsilon_{\Delta f} Tk} + n_K\right)\right\} \qquad \text{Eq. (5)}$$

$$\hat{\beta} = \arg\left\{\sum_{k=1}^{N} \left(e^{j2\pi\varepsilon_{\Delta f} Tk} + n_K\right)\right\} \qquad \text{Eq. (6)}$$

With some approximation for large $E_s/N_0$, the error variance of the unbiased estimate $\hat{\epsilon}_{\Delta f} T$ can be represented as:

$$E\{\hat{\varepsilon}_{\Delta f}^2 T^2\} = \frac{3}{2E_s/N_o\pi^2(N-1)N(N+1)} \qquad \text{Eq. (7)}$$

From Equations 2 and 7, it can be seen that the estimation accuracy of the frequency offset estimator 70 increases as the number of training symbols, N, increases. With a large enough number of training symbols, the theoretical bound can be reached. Conversely, when the number of training symbols decreases, the accuracy of the frequency offset estimator 70 decreases.

In exemplary embodiments of the present invention, the burst generation circuit 65 regenerates the partially received data block when reception of the data block is terminated early in order to increase the number of training symbols or other known data symbols that are available for frequency offset estimation. The regenerated data block is input to the frequency offset estimation circuit 70. The frequency offset estimation circuit 70 can use the regenerated data block to perform frequency offset estimation. Using the regenerated data block to perform frequency offset estimations improves the accuracy of the frequency offset estimates because the number of training symbols or other known data symbols is increased.

In some embodiments, the paging block detection circuit 60 outputs a sequence of predefined bits b corresponding to an empty paging block to the burst generation circuit 65 when an empty paging block is detected. Typically, the bits b comprise layer 2 (L2) fill-frame bits. In this case, the burst generation circuit channel encodes the fill-frame bits b to regenerate the empty paging block. The regenerated empty paging block is then input to the frequency offset estimation circuit. Because all the data symbols of the empty paging block are known, the frequency offset estimation circuit 70 can use all of the data symbols (not just the training symbols) for frequency offset estimation.

In other embodiments of the invention, decoded data bits output by the decoder 55 are input to the burst generation circuit 65. The burst generation circuit 65 may regenerate an entire coded block in cases where the reception of the coded data block was terminated early after successful decoding. In this case, the burst generation circuit 65 can use the decoded data bits to regenerate the entire coded data block. The regenerated coded data block may then be input to the frequency offset estimation circuit 70. In this case, the coded data symbols are known and may be used for frequency offset estimation.

Figure 2:
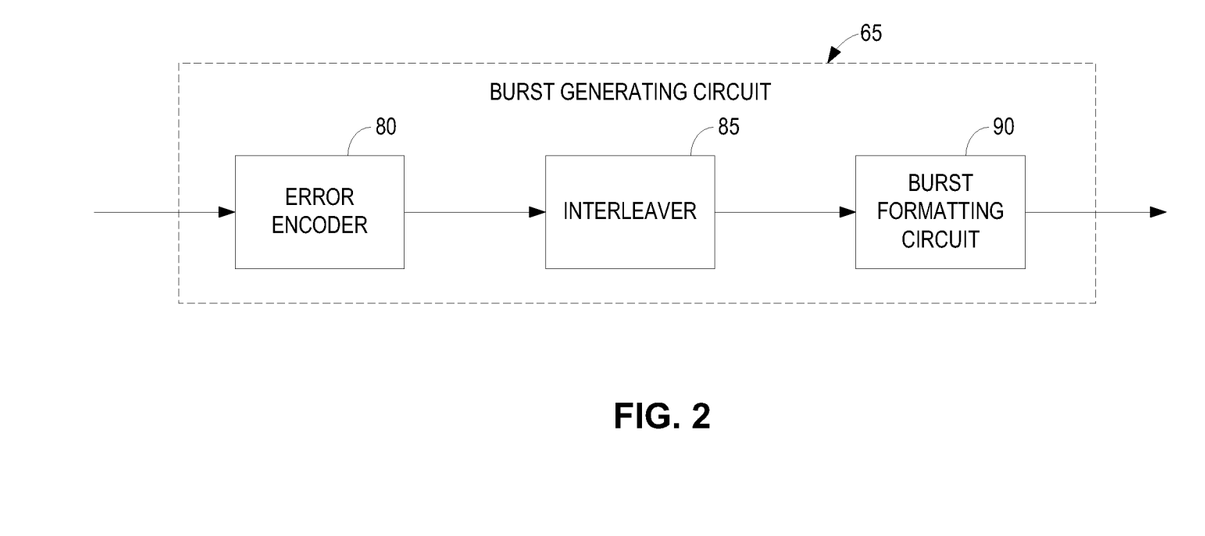
FIG. 2 illustrates a burst generating circuit in a receiver according to an embodiment of the invention.

FIG. 2 illustrates a burst generation circuit 65 according to one embodiment. The burst generation circuit 65 comprises an error encoder 80, interleaver 85, and burst formatting circuit 90. The error encoder 80 uses a Forward Error Correction (FEC) code to encode the data bits input to the burst generation circuit 65. As previously noted, the input data bits may comprise fill-frame bits for an anti-paging block, or decoded data bits that are output by a decoder 55. In some embodiments, the error encoder 80 may append a Cyclic Redundancy Check (CRC) code to the code word output from the FEC encoder. The coded data bits are then input to an interleaver 85 which scrambles the order of the coded data bits. The burst formatting circuit 90 formats the interleaved data bits to create the data bursts corresponding to the data block. The regenerated data block is then output to the frequency offset estimation circuit.

Figure 3:
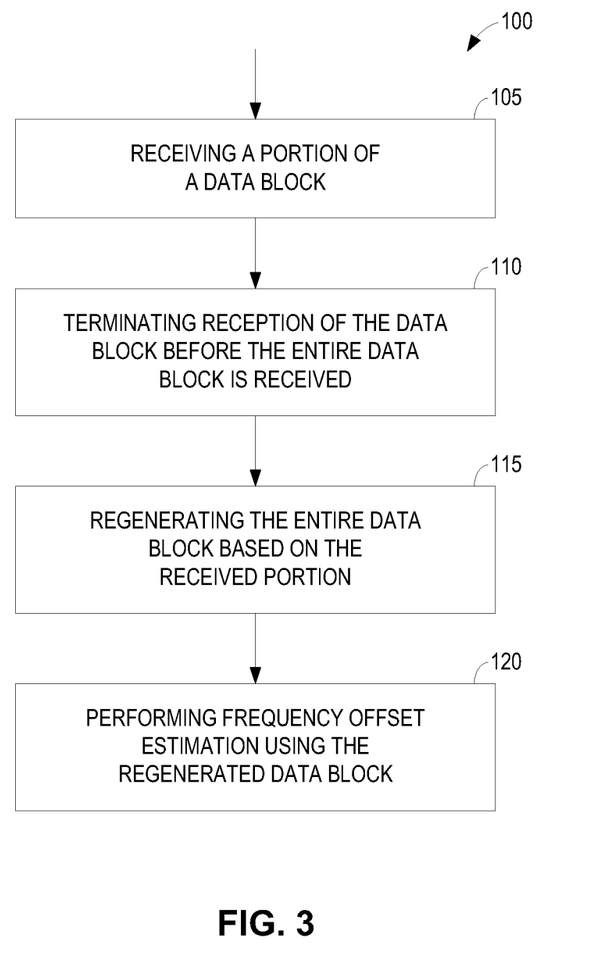
FIG. 3 illustrates a method of frequency offset estimation for use when reception of a data block is terminated early.

FIG. 3 illustrates an exemplary method 100 for frequency offset estimation. The wireless communication terminal 10 receives a portion of a data block (block 105). Before the entire data block is received, the wireless communication receiver 10 terminates reception of the data block (block 110). After terminating reception of the data block, the wireless communication receiver 10 uses information known to the wireless communication receiver 10 to regenerate the entire data block (block 115) and performs frequency offset estimate using the regenerated data block (block 120).

Figure 4:
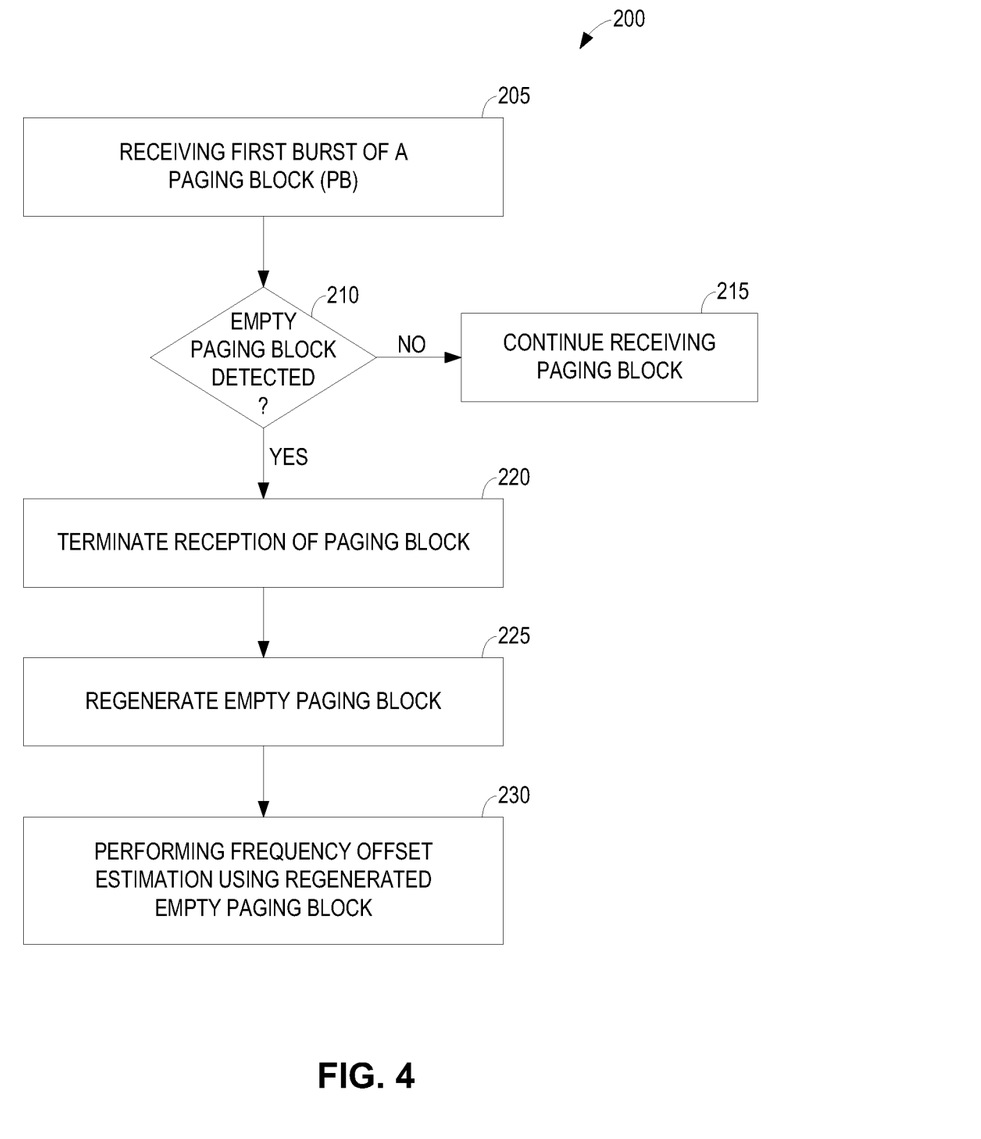
FIG. 4 illustrates a method of frequency offset estimation where reception of an empty paging block is terminated early.

FIG. 4 illustrates an exemplary method 200 for use in the situation where an empty paging block is detected. The wireless communication receiver 10 receives a first burst of a paging block containing four data bursts (block 205). After the first burst is received, the wireless communication receiver 10 determines whether the paging block is an empty paging block (block 210). If the paging block is not an empty paging block, the wireless communication receiver 10 continues receiving the paging block and decodes the paging block (block 215). On the other hand, if the paging block is an empty paging block, the wireless communication receiver 10 terminates reception of the remaining burst in the paging block (block 220). The wireless communication receiver 10 regenerates the empty paging block using known data bits of the empty paging block (block 225). The wireless communication receiver 10 then performs frequency offset estimation using the regenerated empty paging block (block 230).

Figure 5:
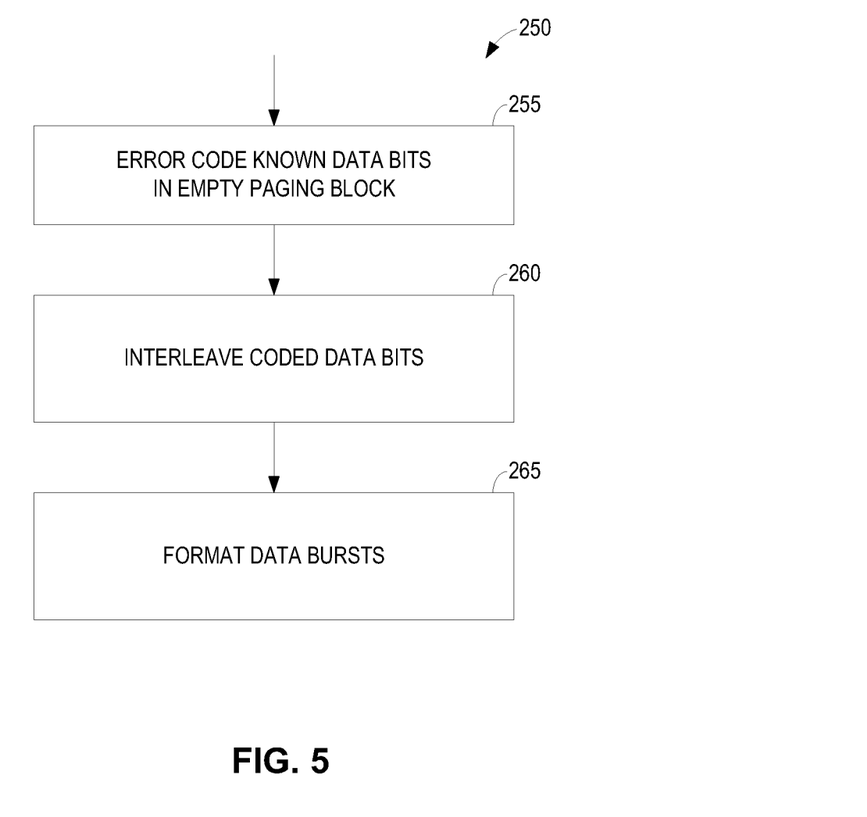
FIG. 5 illustrates a method of regenerating an empty paging block.

FIG. 5 illustrates a method 250 for regenerating an empty paging block. The wireless communication receiver 10 error codes known data bits in an empty paging block to regenerate coded data bits (block 255). The error coding may comprise a forward error correction code, error detection code, or a combination thereof. The coded data bits resulting from the encoding operation are interleaved (block 260). The interleaving operation scrambles the order of the coded data bits. After interleaving, the coded data bits are formatted to create four data bursts of an empty paging block (block 265).

Figure 6:
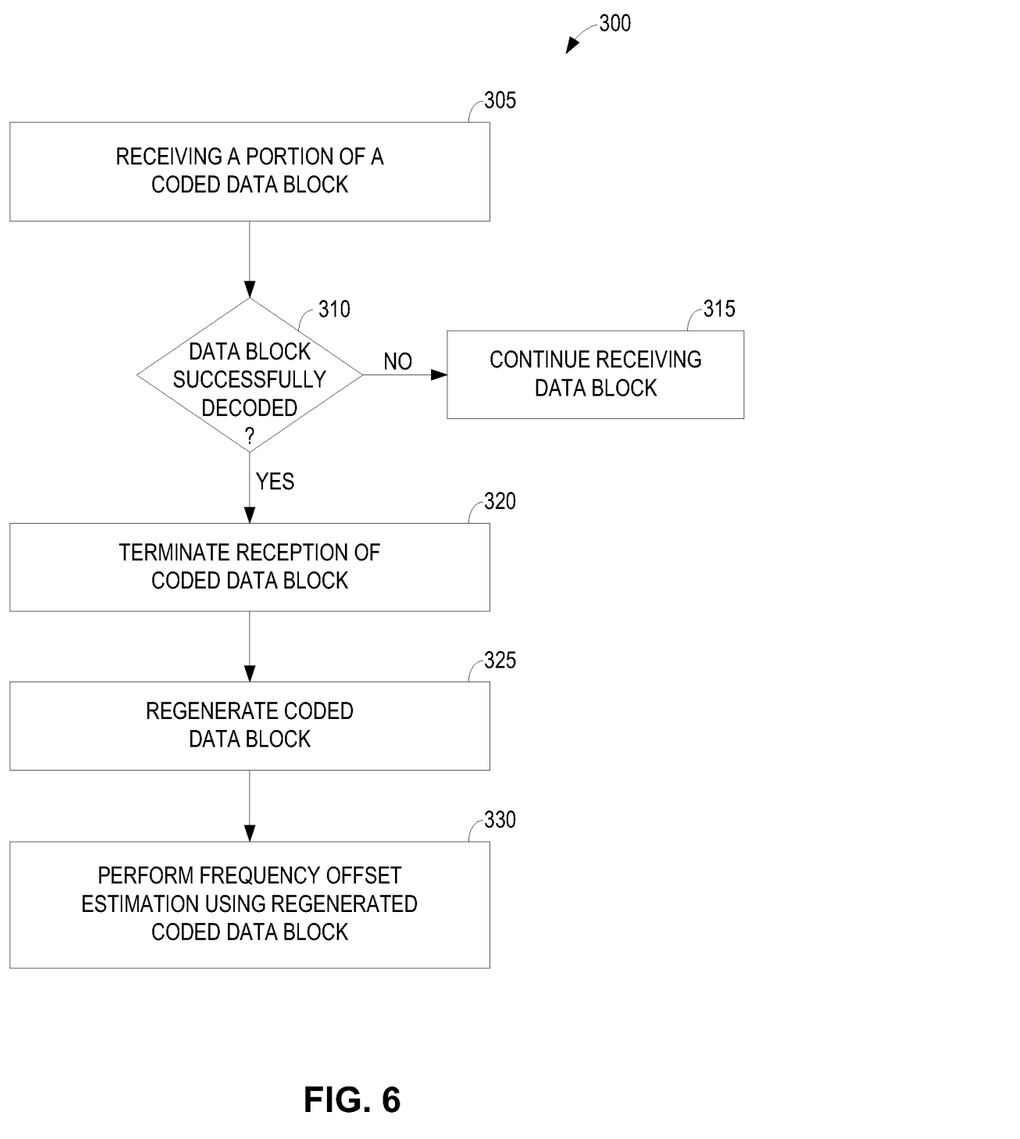
FIG. 6 illustrates a method of frequency offset estimation where reception of a coded block is terminated early.

FIG. 6 illustrates an exemplary method 300 of frequency offset estimation in a wireless communication receiver 10 that implements early decoding. The wireless communication receiver 10 receives a portion of a coded data block (block 305). As an example, the wireless communication device may receive two bursts of a coded data block having a total of four bursts. After receiving the partial data block, the wireless communication receiver 10 decodes the partially received data block and determines whether the decoding is successful (block 310). If the decoding is not successful, the wireless communication receiver 10 continues to receive the next burst of the data block (block 315). On the other hand, if decoding of the data block is successful, the wireless communication receiver 10 terminates reception of the remaining burst in the coded data block (block 320). Using the decoded data bits from the decoder 55, the wireless communication receiver 10 regenerates the entire coded data block (block 325) and performs frequency offset estimation using the regenerated coded data block (block 330).

Figure 7:
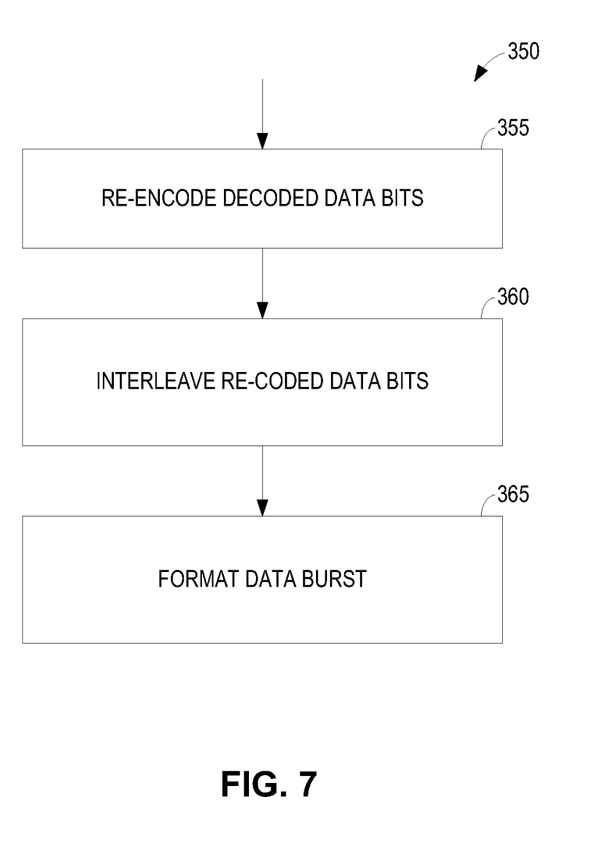
FIG. 7 illustrates a method of regenerating a coded data block.

FIG. 7 illustrates an exemplary method 350 for regenerating a coded data block from a partially received data block. The wireless communication receiver 10 encodes the decoded data bits output by the decoder 55 to regenerate coded data bits (block 355). The re-encoding may comprise FEC coding, error detection coding, or both. After re-encoding, the wireless communication receiver 10 interleaves the regenerated coded data bits (block 360). The wireless communication receiver 10 then formats the coded data bits to create the coded data block (block 365). In some embodiments, the formatting comprises formatting the coded data bits into two or more data bursts.

The techniques herein described may be used when any time reception of a data block is terminated early. Using known information, the entire data block can be regenerated to increase the number of data symbols available for frequency offset estimation. Increasing the number of available symbols for frequency offset estimation improves the accuracy of the frequency offset estimation. The same method can be extended for any other types of estimation employed in the receiver based on known data symbols e.g. data aided estimation techniques. For example, this method can be used for improved time error estimation, channel impulse response estimation etc. In all the cases, as the known bits in the estimation process are increased, so that will lead to improved estimation quality in case of early termination of block data reception.

When a mobile terminal in a wireless communication network is in idle mode, it stays in the sleep mode most of the time and wakes up once in a while as defined by the DRX (Discontinuous Reception) mode to receive a paging block. As the block reception time interval is large, the time gap for frequency error estimation and correction also happens very in-frequently. In this scenario, if the mobile terminal decides to terminate the reception of the full block, the estimation quality becomes very poor. The methods described herein provide useful techniques to improve estimation quality in such scenarios.

What is claimed is:

1. A method in a wireless communication receiver of frequency offset estimation, said method comprising:
   receiving a portion of a data block transmitted from a wireless communication transmitter;
   detecting, based on the received portion, that the data block comprises an empty paging block;
   terminating the reception of the data block responsive to the detection of the empty paging block;
   regenerating the data block based on the received portion; and
   performing frequency offset estimation using the regenerated data block.

2. The method of claim 1 wherein regenerating the data block based on the received portion comprises encoding known data bits in the empty paging block to regenerate coded data bits.

3. The method of claim 2 wherein regenerating the data block based on the received portion further comprises interleaving the regenerated coded data bits.

4. A method in a wireless communication receiver of frequency offset estimation, said method comprising:
   receiving a portion of a coded data block transmitted from a wireless communication transmitter;
   decoding the coded data block using the received portion of the coded data block to obtain decoded data bits;
   terminating the reception of the coded data block responsive to the successful decoding of the coded data block;
   regenerating the coded data block based on the received portion; and
   performing frequency offset estimation using the regenerated coded data block.

5. The method of claim 4 wherein regenerating the data block based on the received portion comprises re-encoding the decoded data bits with an error correction code to regenerate coded data bits.

6. The method of claim 5 wherein regenerating the data block based on the received portion further comprises interleaving the regenerated coded bits to obtain the coded data block.

7. A wireless communication receiver comprising:
   a receiver circuit to receive signals transmitted over a wireless communication channel;
   a processing circuit to process the received signals, said processing circuit configured to:
      receive a portion of a data block transmitted from a wireless communication transmitter;
      detect, based on the received portion, that the data block comprises an empty paging block;
      terminate the reception of the data block responsive to the detection of the empty paging block;
      regenerate the data block based on the received portion; and
      perform frequency offset estimation using the regenerated data block.

8. The wireless communication receiver of claim 7 wherein regenerating the data block based on the received portion by the processing circuit comprises encoding known data bits in the empty paging block to regenerate coded data bits.

9. The wireless communication receiver of claim 8 wherein regenerating the data block based on the received portion further comprises interleaving the regenerated coded data bits.

10. A wireless communication receiver comprising:
    a receiver circuit to receive signals transmitted over a wireless communication channel;
    a processing circuit to process the received signals, said processing circuit configured to:
       receive a portion of a coded data block transmitted from a wireless communication transmitter;
       decode the coded data block using the received first portion of the coded data block to obtain decoded data bits; and
       terminate the reception of the coded block responsive to the successful decoding of the coded data block;
       regenerate the coded data block based on the received portion; and
       perform frequency offset estimation using the regenerated coded data block.

11. The wireless communication receiver of claim 10 wherein regenerating the data block by the processing circuit comprises re-encoding the decoded data bits to regenerate coded data bits.

12. The wireless communication receiver of claim 11 wherein regenerating the data block by the processing circuit further comprises interleaving the regenerated coded data bits to obtain the coded data block.

* * * * *